May 10, 1949.  H. J. HAGEMEYER, JR., ET AL  2,469,690
CONTINUOUS PROCESS OF PRODUCING BETA LACTONES
Filed April 6, 1946
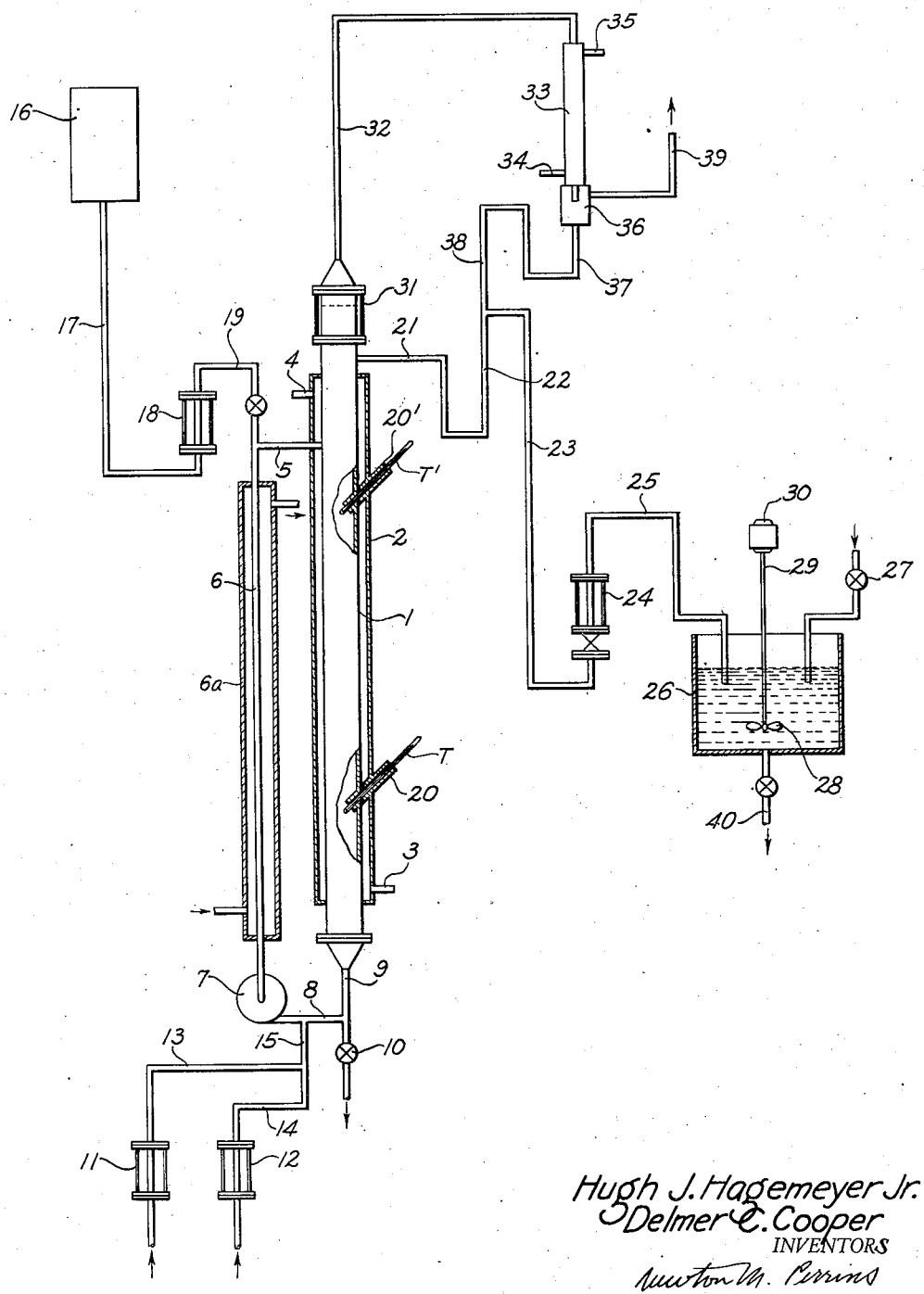
Hugh J. Hagemeyer Jr.
Delmer C. Cooper
INVENTORS
Newton M. Perrins
BY Daniel J. Mayne
ATTORNEYS Patented May 10, 1949

UNITED STATES PATENT OFFICE 2,469,690

CONTINUOUS PROCESS OF PRODUCING BETA LACTONES

Hugh J. Hagemeyer, Jr., and Delmer C. Cooper, Kingsport, Tenn., assignors to Eastman Kodak Company, Rochester, N. Y., a corporation of New Jersey Application April 6, 1946, Serial No. 660,286

6 Claims. (Cl. 260—344)

This invention relates to the production of beta lactones and more particularly to a continuous cyclic process wherein beta lactones may be produced in satisfactory commercial yields and with a minimum of loss by conversion to polymerized or resinified products.

As is known, beta lactones may be formed by condensation of ketenes with carbonyl groups in aldehydes and ketones in accordance with the following graphic formula:

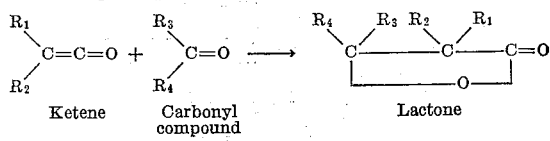

Ketene    Carbonyl compound    Lactone wherein $R_1$, $R_2$, $R_3$ and $R_4$ are hydrogen or hydrocarbon radicals.

Since this reaction is exothermic and liberates a considerable quantity of heat, a number of problems arise in connection with the production of beta lactones on a commercial scale and in satisfactory yields. For example, the desired condensation reaction between the ketene and the carbonyl-containing compound is competing with the tendency of the carbonyl compound to condense with itself and with the polymerization of the ketene to a diketene. If the reaction temperature is not effectively controlled, the increase in heat brought about by these undesired reactions, particularly the polymerization of ketene to diketene, which is highly exothermic, will result in an increase in temperature which will operate to accelerate such undesired reactions. Furthermore, if during the condensation reaction high local concentrations of ketene or carbonyl compound develop, the amount of polymerization or dimerization increases, with the result that the quality and yield of the desired beta lactone is adversely affected. A still further reaction can contribute to reduction of the yield and contamination of the product in that, not only does ketene tend to dimerize in the reactor, but also tends to condense with the aldehyde present to form alpha, beta unsaturated ketones (Boese, U. S. Patent 2,108,427) in accordance with the following equation:

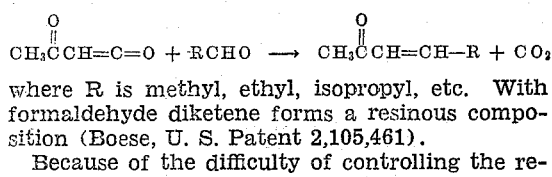

where R is methyl, ethyl, isopropyl, etc. With formaldehyde diketene forms a resinous composition (Boese, U. S. Patent 2,105,461).

Because of the difficulty of controlling the reaction, beta lactones have heretofore been prepared by a batch procedure in which control has been effected by the use of diluents, the object being to reduce the volume of the reacting mass and thus more readily control the temperature of the reaction. This method is, of course, uneconomical and has not resulted in the elimination of the above-mentioned drawbacks, although it has been recognized that because of the great reactivity of ketene and the lower aldehydes and their tendency to polymerize or decompose, and because of the relative instability of beta lactones, it is desirable to carry out the reaction under low temperatures and subsequently to isolate the product by distillation under reduced pressure. It will, of course, be readily recognized that carrying out the reaction in a large body of diluent has the serious disadvantage that the eventual product contains a large amount of the diluent which must eventually be removed by distillation or other equally involved and expensive procedures.

This invention has as an object to provide an efficient, economical continuous process of producing beta lactones. A further object is to provide a continuous process for producing beta lactones in which the temperature of the reacting mixture may be controlled within the desired limits. A still further object is to provide a continuous process for the production in commercial quantities of beta lactones in which loss of product by polymerization or resinification of reactants is minimized or effectively prevented, and in which the desired beta lactone substantially uncontaminated with polymers or resins is obtained. Another object is to provide a continuous process for the production of beta lactones which affords a ready means of continuously adding reactants and catalyst to the reaction mixture and of continuously withdrawing the product formed. A specific object of the invention is to provide a process in which intimate contact and thorough mixing of the various ingredients of the reaction mixture is obtained and wherein localized concentrations of ketene or carbonyl compounds is precluded. Other objects will appear hereinafter.

These objects are accomplished by the following invention which, in its broader aspects, is based upon the discovery that condensation of a ketene (either an aldo ketene or a keto ketene) with a carbonyl compound free from olefinic or acetylenic bonds, such as an aldehyde, a ketone, a diketone, or a keto carboxylic ester in which compounds the carbonyl group is the sole available functional group, to form beta lactones, can be controlled, and that beta lactones can be produced continuously and in satisfactory commercial yields by cycling a solution of the desired ketene and the desired carbonyl compound in solution in the beta lactone through a temperature-controlled reaction chamber and continuously adding the ketene, the carbonyl compound and a suitable condensation catalyst to the cycled solution. We have found that by adding ketene and carbonyl compound simultaneously in equimolar amounts to the cycled solution, as well as an appropriate amount of catalyst, continuously recycling the resulting solution and continuously removing from the recycling mixture the beta lactone which is formed, not only will the vigor of the condensation reaction be reduced, but a more regular liberation of heat will be obtained. Furthermore, the tendency of the reactants to condense or polymerize will be substantially reduced or eliminated and as a result the product will be substantially uncontaminated with polymerized or resinified bodies.

In carrying out the process of our invention we may employ the compound generally referred to as ketene and having the formula $CH_2=C=O$, as well as any other aldo ketene or keto ketene, such compounds being represented by the graphic formula:

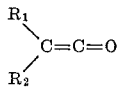

wherein $R_1$ is hydrogen, alkyl, aralkyl or aryl, and $R_2$ is hydrogen, alkyl (especially methyl and ethyl groups), aralkyl or aryl. Examples of typical ketenes are: methyl ketene, ethyl ketene, phenyl ketene, dimethyl ketene, diethyl ketene, diphenyl ketene, benzyl ketene and dibenzyl ketene.

As the carbonyl compound we may employ an aldehyde, a ketone, a diketone or a keto carboxylic ester. Such compounds may be represented by the graphic formula:

wherein $R_3$ is hydrogen, alkyl (especially methyl and ethyl groups), aralkyl, aryl or carbalkoxyl and $R_4$ is alkyl (especially methyl and ethyl groups), aralkyl or aryl. The carbonyl type of compound is typified by formaldehyde, acetaldehyde, acetone, methyl isopropenyl ketone, methyl ethyl ketone, acetophenone, benzaldehyde, methyl levulinate, methyl or ethyl acetoacetate, crotonaldehyde, phenyl acetaldehyde, dibenzyl ketone, benzophenone, ethyl benzoyl acetate, methyl or ethyl pyruvate and furfuraldehyde.

We have found that while the process herein-described is applicable to the production of beta lactones generally by condensing the various ketenes mentioned above with the various carbonyl compounds, it is of particular value in the production of beta propiono lactone by condensing ketene ($CH_2=C=O$) with formaldehyde and in the production of beta butyro lactone by condensing ketene with acetaldehyde.

In carrying out the process of our invention the ketene and the carbonyl compound, together with a condensation catalyst, such as a Friedel-Crafts type catalyst, for example, zinc chloride, or a non-Friedel-Crafts type catalyst, such, for example as boric acid, preferably in solution in a liquid such as acetone, which is inert with respect to both the reactants and the desired product, is continuously introduced (preferably in equimolecular amounts) into, and recycled through, a reaction vessel which has been previously charged with the beta lactone it is desired to produce. The reaction vessel is provided with temperature-controlling means such as a cooling jacket or externally or internally disposed cooling coils. As the reactants are added, an equivalent volume of solution containing a substantial proportion of the beta lactone, but which may also contain some small amount of unreacted materials and catalyst is continuously withdrawn from the cycling liquid. From the withdrawn portion of liquid the uncondensable gases are separated and the liquid mixture metered to an appropriate container where, in the event a Friedel-Crafts type catalyst such as zinc chloride has been employed, the catalyst is neutralized by the addition of a caustic such as sodium hydroxide. If a non-Friedel-Crafts type catalyst such as boric acid is employed, neutralization will, in general, be unnecessary. Thereafter the beta lactone, substantially free from polymers or resinified materials, may then be recovered from the solution or reaction mixture by known procedures such as distillation under low temperature and reduced pressure.

In accordance with our invention the temperature of the reaction should be controlled within certain limits within the range of $-50°$ C. and $+50°$ C. In general, beta lactones of satisfactory quality may be produced at commercially acceptable rates at a reaction temperature within the range of $0°$ C. to $25°$ C., preferably at $10-20°$ C., although other temperatures above or below these particular ranges and within the broad range may be employed, with appropriate adjustment of recycling rate, feed rates of ketene, carbonyl compound and of catalyst solution. We have found that dilution of ketene and carbonyl compound with the lactone lessens the vigor of the condensation reaction and permits an even liberation of the exothermic heat. In addition, the effect of dilution, as indicated above, is greatly to lower the tendency of the ketene to dimerize and then condense with aldehydes, particularly the lower aliphatic aldehydes like formaldehyde, to form undesired resinous materials.

It will, of course, be evident that the rate at which the ketene and carbonyl compound are added to the lactone solution, the rate of circulation, and the temperature of the reactor are mutually dependent, inasmuch as a variation in one may be counterbalanced by an appropriate change in one or both of the other variables. For example, a high rate of feed which would tend to increase the heat of reaction may be compensated for by an increase in the cycling rate or by lowering the jacket temperature of the reactor, or both.

In accordance with our invention the condensation reaction may be carried out in the presence of several different types of catalysts. In general these may be designated Friedel-Crafts catalysts and non-Friedel-Crafts catalysts.

Included in the first category of catalysts may be mentioned substances known to promote Friedel-Crafts reactions including, for example, the halides of boron, zinc, aluminum, tin, titanium and iron, as well as complexes of these halides with organic compounds such as ethyl ether, ethyl chloride, and the like.

In the second category of catalysts we may employ such catalysts as boric acid, an ester of boric acid and an alcohol, such as triethyl borate, or an acylated boric acid such as boron triacetate. Such catalysts can be represented by the following graphic formula:

wherein $R_5$ represents a hydrogen atom, an alcohol radical (especially methyl, ethyl, n-propyl, n-butyl, and isobutyl groups, i. e., a primary alkyl group of the formula $C_nH_{2n+1}$ wherein $n$ represents a positive integer of from 1 to 4) and an acyl group (especially an acetyl or propionyl group).

Typical boron compounds formulated above include boric acid, trimethyl borate, triethyl borate, tri-n-propyl borate, tri-n-butyl borate, triacetyl boric acid and tripropionyl boric acid. Acylated boric acids are formed upon bringing boric acid into contact with a ketene. Boric acid is advantageously employed as the catalyst.

The amount of catalyst employed may vary over a rather wide range, but in general we prefer to maintain in the reaction mixture an amount of catalyst corresponding to .1% to 3% of the total reaction mixture, that is, the mixture of beta lactone, all reactants, plus solvent, if any. The catalyst is preferably introduced in the form of a solution in a solvent which is inert with respect both to the reactants and the beta lactone produced. A satisfactory catalyst solution may, for example, be a 10% acetone solution of zinc chloride or other Friedel-Crafts type of catalyst introduced at such a rate that the reaction mixture will contain .1% to .3% of the catalyst. Alternatively, a 10% acetone solution of boric acid, a boric acid ester, or an acylated boric acid may be employed with equal effectiveness.

In the following examples and description we have set forth several of the preferred embodiments of our invention, but they are included merely for purposes of illustration, and not as a limitation thereof.

The single figure of the drawing is a diagrammatic illustration in the nature of a flow sheet of one form of apparatus in which the condensation of various ketenes with various carbonyl compounds to produce beta lactones may be carried out in accordance with our invention.

*Example 1*

Referring to the drawing, numeral 1 designates a reactor which may, for example, be in the nature of a stainless steel cylindrical tube of a height of 3 feet and having an inside diameter of 2 inches, which is provided with a cooling jacket 2 through which may be circulated an appropriate cooling medium such as cold water, brine, glycol, or the like, the medium finding its way into the jacket via inlet 3 and being withdrawn therefrom via outlet 4.

Reactor 1 forms part of a cyclic system made up of the reactor, conduit 5, return conduit 6, pump 7, and conduits 8 and 9, all connected as shown so as to provide a continuous path or cycle through which the reaction mixture is circulated by means of pump 7. Return conduit 6 is provided with appropriate cooling means adapted to maintain the temperature of the liquid being returned to pump 7 at approximately the same value as that of the liquid in reactor 1. Such cooling means may take the form of a jacket $6a$ through which a cooling medium may be circulated as indicated by the arrows.

A drain valve 10 is provided in conduit 9 below its junction with conduit 8 to provide appropriate means for removing material from the reactor or the cyclic system, as may be desired.

Means are provided for introducing reactants, such as ketene and formaldehyde into the system through rotameters 11 and 12, respectively, the latter of which may be provided with an appropriate jacket supplied with a heat exchange medium maintained at a temperature sufficient to keep the formaldehyde in the vapor phase. Upon leaving the respective rotameters, the reactants are conveyed through conduits 13 and 14, respectively, thereafter meeting in conduit 15 which conveys them immediately into conduit 8 where they meet and mix with the stream of liquid circulated by pump 7.

Numeral 16 designates a storage tank for supplying to the cyclic system an appropriate catalyst solution, such as a 10% solution of anhydrous zinc chloride in acetone, the solution being continuously fed through conduit 17, rotameter 18 and valved conduit 19 and thence into the circulating stream of liquid at the junction of conduits 5 and 6, at such a rate as to maintain in the body of the solution in reactor 1 a constant catalyst concentration, for example, of .3%.

Reactor 1 is provided with appropriate wells 20 and 20' through which are inserted thermometers T and T' for measuring the temperature of the mixture within the reactor 1.

Reactor 1 is provided with an outlet conduit 21 equipped with liquid seal 22, the material flowing therethrough eventually finding its way by overflow through conduit 23, rotameter 24 and conduit 25 to neutralizing tank 26 where, if a Friedel-Crafts type of catalyst has been employed, provision is made for neutralization by caustic introduced as desired through valved conduit 27. Provision is made for agitation of the mixture undergoing neutralization through a rotary stirrer 28 mounted on shaft 29 and driven by motor 30. Provision is also made for removing the neutralized liquid from tank 26 by means of valved conduit 40.

The top of reactor 1 is connected through sight glass 31, a suitable coupling, and through conduit 32, with condenser 33, the latter being supplied with appropriate cooling liquid through inlet 34 and outlet 35. In the event some of the beta lactone solution is mechanically carried out of reactor 1 by the incondensable gases in the ketene stream, it is condensed out in condenser 33. The condensed beta lactone is separated from the gaseous material in separator 36, the condensate being returned through liquid seal 37 and conduit 38 into the overflow line 23. The incondensable gases find their way out of the system through vent pipe 39.

The process of condensing ketenes with carbonyl compounds to form beta lactones in accordance with our invention may be carried out in this apparatus as follows:

Reactor 1 is charged with beta propiono lactone, pump 7 is started and the lactone is circulated through the cyclic system constituted by reactor 1, conduits 5 and 6, pump 7 and conduits 8 and 9, at the rate of two gallons per minute and in sufficient total amount completely to fill the system. In passing through the reactor the liquid is cooled by means of a heat exchange medium such as cold water, brine or glycol circulating through jacket 2 supplied at such a temperature as to reduce the temperature inside the reactor to the desired point such, for example, as 10° C. Once the liquid is circulating in the system it meets and is mixed with a catalyst solution such as a 10% solution of anhydrous zinc chloride in acetone, introduced through rotameter 18 and valved conduit 19 in such metered amounts as to give a concentration in the reaction mixture of about 0.3% of zinc chloride. On its way through pump 7 and conduits 8 and 9, the mixture of lactone and catalyst solution meets and is mixed with a mixture of ketene gas and vaporized or gaseous formaldehyde, which may be obtained, for example, by heating paraformaldehyde in a suitable vaporizer (not shown) which mixture enters the circulating stream of liquid through conduit 15. The rates of flow of ketene and formaldehyde are such that 7 grams of ketene and 5 grams of formaldehyde per minute are mixed with the cycling lactone solution.

The condensation reaction between the ketene and the formaldehyde begins to take place immediately in the lactone solution, and since the reaction is exothermic, a considerable amount of heat is given off. Beta propiono lactone is continuously formed as the liquid progresses through the reactor and the heat of reaction is continuously absorbed by circulation of the cooling medium through jacket 2.

A sufficient amount of the reaction mixture is continuously withdrawn from or overflows from the upper part of reactor 1 through conduit 21 to compensate for or balance the increase in the liquid volume due to introduction of reactants and catalyst solution. This continuously withdrawn portion passes through liquid seal 22, conduit 23, rotameter 24 and conduit 25 into neutralizing tank 26. Here, if a Friedel-Crafts type of catalyst has been employed, it is mixed with a neutralizing solution, such as 40% aqueous solution of sodium hydroxide.

The beta lactone solution may be removed from tank 26 as desired through valved conduit 40 and treated by known procedures, such as distillation, preferably at reduced pressure, to separate the beta lactone product in substantially polymer- and resin-free condition.

In a typical run extending over eight hours, 3360 grams of ketene and 2400 grams of paraformaldehyde were vaporized and charged to the reactor in addition to 225 milliliters of a 10% acetone solution of zinc chloride. The overflow was neutralized in the cold with a 40% aqueous caustic solution. A high grade of beta propiono lactone was obtained in 85% yield having a boiling point at a pressure of 100 mm. of mercury of 82° to 83° C., and an index of refraction of 1.430.

*Example 2*

A 24-hour run was made employing the apparatus and procedure of Example 1 as follows: The reactor 1 was first charged with beta propiono lactone and pump 7 started. In 24 hours, 10,080 grams of ketene and 7240 grams of formaldehyde were fed to the cyclic system. During this period 100 grams of boric acid dissolved in 5 liters of acetone were metered into the system at such a rate as to maintain in the reaction mixture an amount of boric acid corresponding to .1% to .3% of the total mixture. At the end of the run the accumulated reaction mixture was fed to a still adapted for operation at reduced pressure. The still was heated carefully to remove the greater part of the acetone and the residue was then distilled under reduced pressure. A 72% yield of beta propiono lactone boiling at 82° to 83° C. at 100 mm. of mercury pressure and having a refractive index of 1.4129 was thus obtained.

*Example 3*

A 48-hour run was made employing the apparatus and procedure of Example 1 as follows: The reactor 1 was first charged with beta butyro lactone and pump 7 started. In 48 hours 19,642 grams of ketene and 21,000 grams of acetaldehyde were fed to the cyclic system. During this period 50 grams of boric acid dissolved in 500 grams of acetic anhydride and diluted with 2 liters of acetone were metered into the system at such a rate as to maintain in the reaction mixture an amount of triacetyl borate corresponding to 0.1 to 0.3% of the total reaction mixture. The overflow was led continuously to a flash evaporator heated to 80–90° C. at 2 mm. of mercury pressure and the vapors therefrom were condensed by scrubbing with cold (0–10° C.) beta butyro lactone. Redistillation at 10 mm. of mercury pressure gave a 62% yield of beta butyro lactone boiling at 54° C.

It will, of course, be understood that many variations in the process and apparatus described above may be made within the scope of our invention. For example, the rates of feed, rate of recycling, and the quantities of materials introduced into the cyclic system, and likewise the amounts of materials withdrawn therefrom, can be varied over wide ranges without materially altering the results attained.

Similarly, the reaction temperature may vary depending upon the type of reactants employed, the particular beta lactone being manufactured, the rate of recycling, and various other factors. In general, however, the reaction temperature should be kept within the range of −50° to +50° C., and preferably within the range of 10°–20° C., since we have found that carrying out the process under such circumstances obviates or minimizes the formation of undesired resinified or polymerized products which would otherwise contaminate the desired beta lactone product.

It will be evident that our invention has many unusual and unexpected advantages over previous methods of producing beta lactones. Not only are we enabled to obtain exceptionally high yields, running on the average between 70% and 90%, but our process affords a simple and highly efficient means of obtaining beta lactones continuously and at commercially practicable production rates. One of the outstanding features of our invention is that it makes possible the obtaining of the beta lactone product in substantially pure form free from undesired polymers and resinified materials and other high-boiling contaminants.

Another important advantage is that by causing the reaction between the ketene and the carbonyl compound to take place in a solution or body of the beta lactone undergoing production, an efficient means of keeping down and controlling the exothermic heat is afforded with its many attendant operating advantages. Our process is also a marked improvement over the batch procedure heretofore employed, not only because it is far more economical and practical, but also because it obviates the necessity for separating the beta lactone product from the large amounts of inert diluents or solvents made necessary by batch operation. Many other advantages will be apparent to those skilled in the art.

What we claim is:

1. The process of producing beta lactones by condensing a ketene with a compound containing a carbonyl group and having the graphic formula:

wherein R₃ is a substituent selected from hydrogen, alkyl, aralkyl aryl and carbalkoxyl groups and R₄ is a substituent selected from alkyl, aralkyl and aryl groups as the sole functional group, which comprises maintaining a body of a solution of the ketene and carbonyl compound in the beta lactone, controlling the temperature of the body of solution within the range of −50° C. to +50° C., continuously withdrawing a portion of the solution from said body, continuously adding ketene, carbonyl compounds and a solution of a condensation catalyst to the withdrawn portion, returning the part of the solution to which the ketene, carbonyl compound and catalyst solution were added to the body of solution, and continuously removing from the recycling solution a portion thereof corresponding in amount to the amount of the reactants and the catalyst solution introduced.

2. The process of producing beta lacetones by condensing a ketene with a compound containing a carbonyl group and having the graphic formula:

wherein R₃ is a substituent selected from hydrogen, alkyl, aralkyl aryl and carbalkoxyl groups and R₄ is a substituent selected from alkyl, aralkyl and aryl groups as the sole functional group, which comprises maintaining a body of a solution of the ketene and carbonyl compound in the beta lactone, controlling the temperature of the body of solution within the range of −50° C. to +50° C., continuously withdrawing a portion of the solution from said body, continuously adding ketene and carbonyl compound in equimolecular amounts to the withdrawn portion, simultaneously adding a solution in an inert solvent of a condensation catalyst to the withdrawn portion, returning the part of the solution to which the ketene, carbonyl compound and catalyst solution were added to the body of solution, and continuously removing from the recycling solution a portion thereof corresponding in amount to the amount of the reactants and the catalyst solution introduced.

3. The process of producing beta lactones by condensing a ketene with a compound containing a carbonyl group and having the graphic formula:

wherein R₃ is a substituent selected from hydrogen, alkyl, aralkyl aryl and carbalkoxyl groups and R₄ is a substituent selected from alkyl, aralkyl and aryl groups as the sole functional group, which comprises maintaining a body of a solution of the ketene and carbonyl compound in the beta lactone, controlling the temperature of the body of solution within the range of −50° C. to +50° C., continuously adding ketene and carbonyl compound in equimolecular amounts to the withdrawn portion, simultaneously adding a solution in an inert solvent of a boron condensation catalyst to the withdrawn portion, returning the part of the solution to which the ketene, carbonyl compound and catalyst solution were added to the body of solution, and continuously removing from the recycling solution a portion thereof corresponding in amount to the amount of the reactants and the catalyst solution introduced.

4. The process of producing beta propiono lactone by condensing ketene with formaldehyde, which comprises maintaining a body of a solution of ketene and formaldehyde in beta propiono lactone, controlling the temperature of the body of the solution within the range of −50° C. to +50° C., continuously withdrawing a portion of the solution from said body, continuously adding ketene and formaldehyde in equimolecular amounts to the withdrawn portion, simultaneously adding a solution in an inert solvent with a boron condensation catalyst to the withdrawn portion, returning the part of the solution to which the ketene, formaldehyde and catalyst solution were added to the body of the solution, continuously removing from the recycling solution a portion thereof corresponding in amount to the amount of the reactants and the catalyst solution introduced.

5. The process of producing beta butyro lactone by condensing ketene with acetaldehyde, which comprises maintaining a body of solution of ketene and acetaldehyde in beta butyro lactone, controlling the temperature of the solution within a range of −50° C. to +50° C., continuously withdrawing a portion of the solution from said body, continuously adding ketene and acetaldehyde in equimolecular amounts to the withdrawn portion, simultaneously adding a solution in an inert solvent of a condensation catalyst to the withdrawn portion, returning the part of the solution to which the ketene acetaldehyde and catalyst solution were added to the body of the solution, and continuously removing from the recycling solution a portion thereof corresponding in amount to the amount of the reactants and the catalyst solution introduced.

6. The process of producing beta butyro lactone by condensing ketene with acetaldehyde, which comprises maintaining a body of solution of ketene and acetaldehyde in beta butyro lactone, controlling the temperature of the solution within a range of −50° C. to +50° C., continuously withdrawing a portion of the solution from said body, continuously adding ketene and acetaldehyde in equimolecular amounts to the withdrawn portion, simultaneously adding a solution in an inert solvent of a boron condensation catalyst to the withdrawn portion, returning the part of the soution to which the ketene acetaldehyde and catalyst solution were added to the body of the solution, and continuously removing from the recycling liquid a portion thereof corresponding in amount to the amount of the reactants and the catalyst solution introduced.

HUGH J. HAGEMEYER, JR.
DELMER C. COOPER.

REFERENCES CITED

The following references are of record in the file of this patent:

UNITED STATES PATENTS

| Number | Name | Date |
|---|---|---|
| 2,356,459 | Kung | Aug. 22, 1944 |
| 2,424,589 | Steadman | July 29, 1947 |